(12) United States Patent
He et al.

(10) Patent No.: US 8,473,486 B2
(45) Date of Patent: Jun. 25, 2013

(54) TRAINING PARSERS TO APPROXIMATELY OPTIMIZE NDCG

(75) Inventors: Xiaodong He, Issaquah, WA (US);
Jianfeng Gao, Kirkland, WA (US);
Jennifer Gillenwater, Philadelphia, PA (US)

(73) Assignee: Microsoft Corporation, Redmond, WA (US)

( * ) Notice: Subject to any disclaimer, the term of this patent is extended or adjusted under 35 U.S.C. 154(b) by 398 days.

(21) Appl. No.: 12/962,751

(22) Filed: Dec. 8, 2010

(65) Prior Publication Data
US 2012/0150836 A1 Jun. 14, 2012

(51) Int. Cl.
*G06F 7/00* (2006.01)
*G06F 17/30* (2006.01)

(52) U.S. Cl.
USPC ............................................. 707/722

(58) Field of Classification Search
USPC ................... 707/705, 722, 723, 728
See application file for complete search history.

(56) References Cited

U.S. PATENT DOCUMENTS

| | | | | |
|---|---|---|---|---|
| 6,128,606 A * | 10/2000 | Bengio et al. | ...... | 706/10 |
| 7,610,191 B2 * | 10/2009 | Gao et al. | ...... | 704/9 |
| 8,145,474 B1 * | 3/2012 | Daily et al. | ...... | 704/9 |
| 2004/0243568 A1 * | 12/2004 | Wang et al. | ...... | 707/3 |
| 2005/0262056 A1 | 11/2005 | Hamzy et al. | | |
| 2007/0239632 A1 | 10/2007 | Burges et al. | | |
| 2008/0172375 A1 | 7/2008 | Burges et al. | | |
| 2010/0162097 A1 * | 6/2010 | Dalvi et al. | ...... | 715/234 |

OTHER PUBLICATIONS

Javanmardi et al, Optimizing Two-Stage Bigram Language Models for IR, WWW 2010, Apr. 26-30, 2010, Raleigh, North Carolina, 2 pp.*

Valizadegan, et al., "Learning to Rank by Optimizing NDCG Measure", Retrieved at << http://www.cse.msu.edu/ ~valizade/Publications/NDCG_Boostpdf >>, Proceedings of the 23th annual international ACM SIGIR conference on Research and development in information retrieval, 2000, pp. 1-9.

Chen, et al., "Trada: Tree Based Ranking Function Adaptation", Retrieved at << http://www.cs.wright.edu/—keke.chen/ papers/cikmfp0705-chen.pdf >>, Conference on Information and Knowledge Management, Oct. 26-30, 2008, pp. 10.

Park, et al., "Query Term Ranking based on Dependency Parsing of Verbose Queries", Retrieved at << http://59.108.48.12/proceedings/sigir/sigir2010/docs/p829.pdf >>, Proceeding of the 33rd International ACM SIGIR Conference on Research and Development in Information Retrieval, SIGIR, Jul. 19-23, 2010, pp. 829-830.

(Continued)

Primary Examiner — Marc Somers
(74) Attorney, Agent, or Firm — Turk IP Law, LLC

(57) ABSTRACT

A supervised technique uses relevance judgments to train a dependency parser such that it approximately optimizes Normalized Discounted Cumulative Gain (NDCG) in information retrieval. A weighted tree edit distance between the parse tree for a query and the parse tree for a document is added to a ranking function, where the edit distance weights are parameters from the parser. Using parser parameters in the ranking function enables approximate optimization of the parser's parameters for NDCG by adding some constraints to the objective function.

20 Claims, 6 Drawing Sheets

OTHER PUBLICATIONS

Taylor, et al., "Optimisation Methods for Ranking Functions with Multiple Parameters", Retrieved at << http:// research.microsoft.com/en-us/um/people/cburges/papers/cikm-fp488-taylor.pdf >>, Proceedings of the ACM CIKM International Conference on Information and Knowledge Management, Arlington, Nov. 6-11, 2006, pp. 9.

Chapelle, et al., "Gradient Descent Optimization of Smoothed Information Retrieval Metrics", Retrieved at << http://www.chapelle.cc/olivier/pub/smoothgrad.pdf >>, Aug. 11, 2009, pp. 1-21.

Le, et al., "Direct Optimization of Ranking Measures", Retrieved at << http://arxiv.org/PS_cache/arxiv/pdf/0704/0704.3359v1.pdf >>, Feb. 5, 2008, pp. 1-25.

* cited by examiner

TRAINING PARSERS TO APPROXIMATELY OPTIMIZE NDCG

BACKGROUND

Search engines discover and store information about documents such as web pages, which they typically retrieve from the textual content of the documents. The documents are sometimes retrieved by a crawler or an automated browser, which may follow links in a document or on a website. Conventional crawlers typically analyze documents as flat text files examining words and their positions (e.g. titles, headings, or special fields). Data about analyzed documents may be stored in an index database for use in later queries. A query may include a single word or a combination of words.

A long query can often better express a user's information need than a short query. For example, the addition of qualifying phrases can help describe a user's target more precisely and express more complex relationships among terms. However, web search results for long queries are notoriously worse than those for short queries. Attempts to improve long query results may be classified into five categories: query reduction, query expansion, query reformulation, term and concept weighting, and query segmentation.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to a supervised technique that uses relevance judgments to train a dependency parser such that it approximately optimizes Normalized Discounted Cumulative Gain (NDCG) in information retrieval. According to some embodiments, a weighted tree edit distance between the parse tree for a query and the parse tree for a document (e.g., title, body, metadata) may be added to a ranking function, where the edit distance weights are parameters from the parser. Using parser parameters in the ranking function enables approximate optimization of the parser's parameters for NDCG by adding some constraints to the objective function.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

Figure 1:
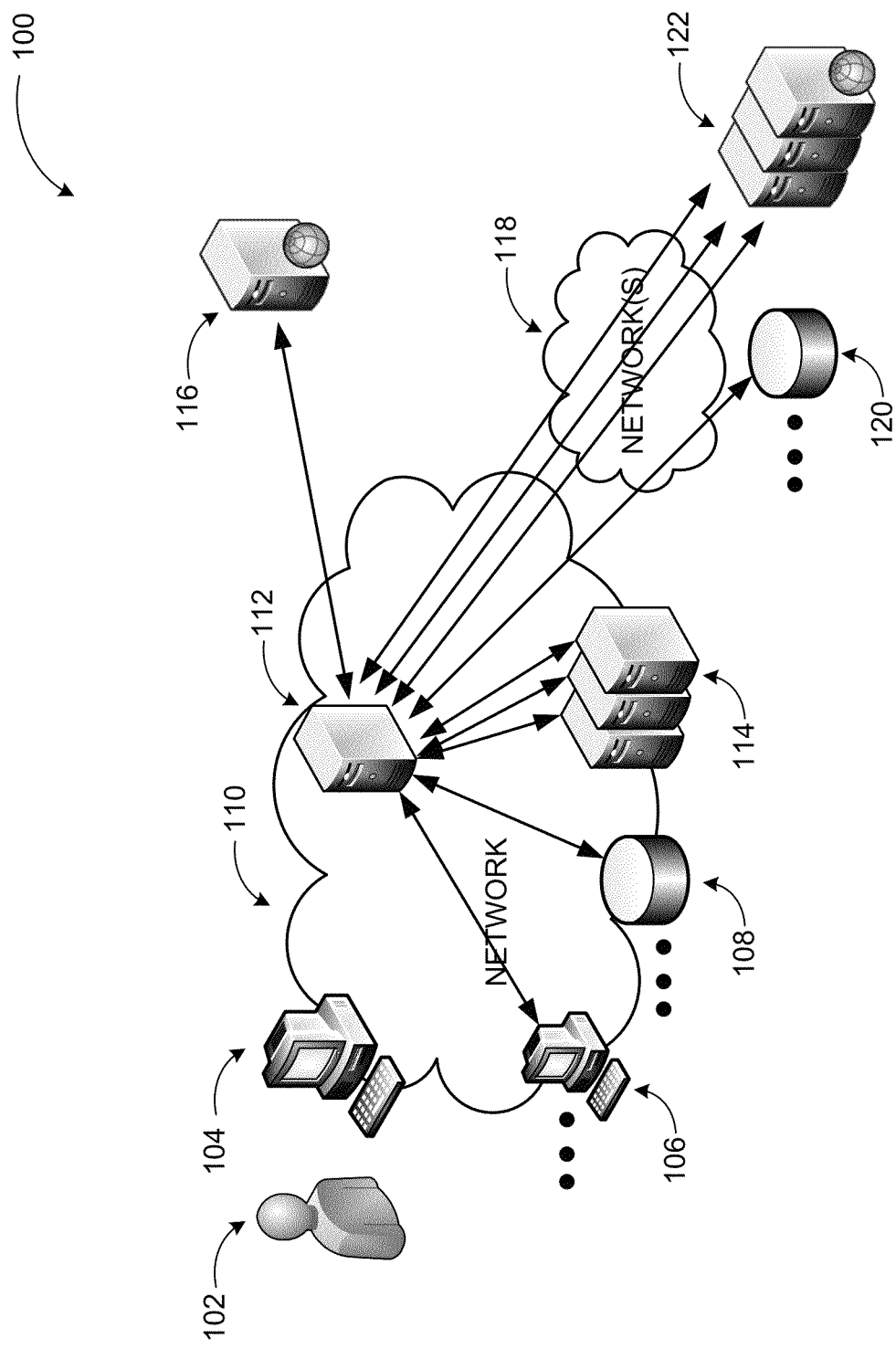
FIG. 1 is a conceptual diagram illustrating search operations in a networked search environment capable of using a trained parser to optimize NDCG.

As briefly described above, a weighted tree edit distance between the parse tree for a query and the parse tree for a document may be added to a standard ranking function, where the edit distance weights are parameters from the parser. Using parser parameters in the ranking function enables approximate optimization of the parser's parameters for NDCG by adding some constraints to the objective function. In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While the embodiments will be described in the general context of program modules that execute in conjunction with an application program that runs on an operating system on a computing device, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium can for example be implemented via one or more of a volatile computer memory, a non-volatile memory, a hard drive, a flash drive, a floppy disk, or a compact disk, and comparable media.

Throughout this specification, the term "platform" may be a combination of software and hardware components for managing computer and network operations, which may include searches. Examples of platforms include, but are not limited to, a hosted service executed over a plurality of servers, an application executed on a single server, and comparable systems. The term "server" generally refers to a computing device executing one or more software programs typically in a networked environment. However, a server may also be implemented as a virtual server (software programs) executed on one or more computing devices viewed as a server on the network. More detail on these technologies and example operations is provided below.

FIG. 1 includes conceptual diagram 100 illustrating search operations in a networked search environment capable of training a parser to optimize NDCG. The networked search environment shown in diagram 100 is for illustration purposes. Embodiments may be implemented in various networked environments such as enterprise-based networks, cloud-based networks, and combinations of those.

Search engines employ a variety of methods to rank the results or index them based on relevance, popularity, or authoritativeness of documents compared to others. Indexing also allows users to find sought information promptly. When a user submits a query to a search engine (e.g. by using key words), the search engine may examine its index and provide a listing of matching results according to predefined criteria. The index may be built from the information retrieved from the contents of the crawled document and/or user data and the method by which the information is indexed. The query may be a short query or a long query, and include parameters such as Boolean operators (e.g. AND, OR, NOT, etc.) that allow the user to refine and extend the terms of the search.

Parsing models for improving long query results may enable exploitation of longer-range word dependencies than just those within a noun phrase or between adjacent words. Such dependencies may be especially important for long queries. Furthermore, by imposing standard parsing constraints requiring that the links in each parse form a projective tree, dynamic programming algorithms for parsing may be utilized. Moreover, with parse trees a different sort of ranking function—tree edit distance—may be employed. This algorithm is similar to the ranking function of translation models in the sense that there is some cost for exchanging one word in the query for another in the retrieved document, but different because the cost can condition on the tree structure. Tree edit distance is also different because it does not map directly to a probability.

In the example system of diagram 100, user 102 may interact with a variety of networked services through their client 104. Client 104 may refer to a computing device executing one or more applications, an application executed on one or more computing devices, or a service executed in a distributed manner and accessed by user 102 through a computing device. In a typical system client 104 may communicate with one or more servers (e.g., server 112). Server 112 may execute search operations for user 102 searching documents on server 112 itself, other clients 106, data stores 108, other servers of network 114, or resources outside network 110.

In an example scenario, network 110 may represent an enterprise network, where user 102 may submit a search request. A search application on server 112 may crawl and evaluate documents training a parser module to approximately optimize NDCG. The search may also include resources outside network 110 such as server 116 or servers 122 and data stores 120, which may be accessed through at least one other network 118. The search may be performed on a database source, an analysis service, a portal, another server, and/or a desktop.

The example system in FIG. 1 has been described with specific servers, client devices, software modules, and interactions. Embodiments are not limited to systems according to these example configurations. Training a parser to optimize NDCG may be implemented in configurations employing fewer or additional components and performing other tasks. Furthermore, specific protocols and/or interfaces may be implemented in a similar manner using the principles described herein.

Figure 2:
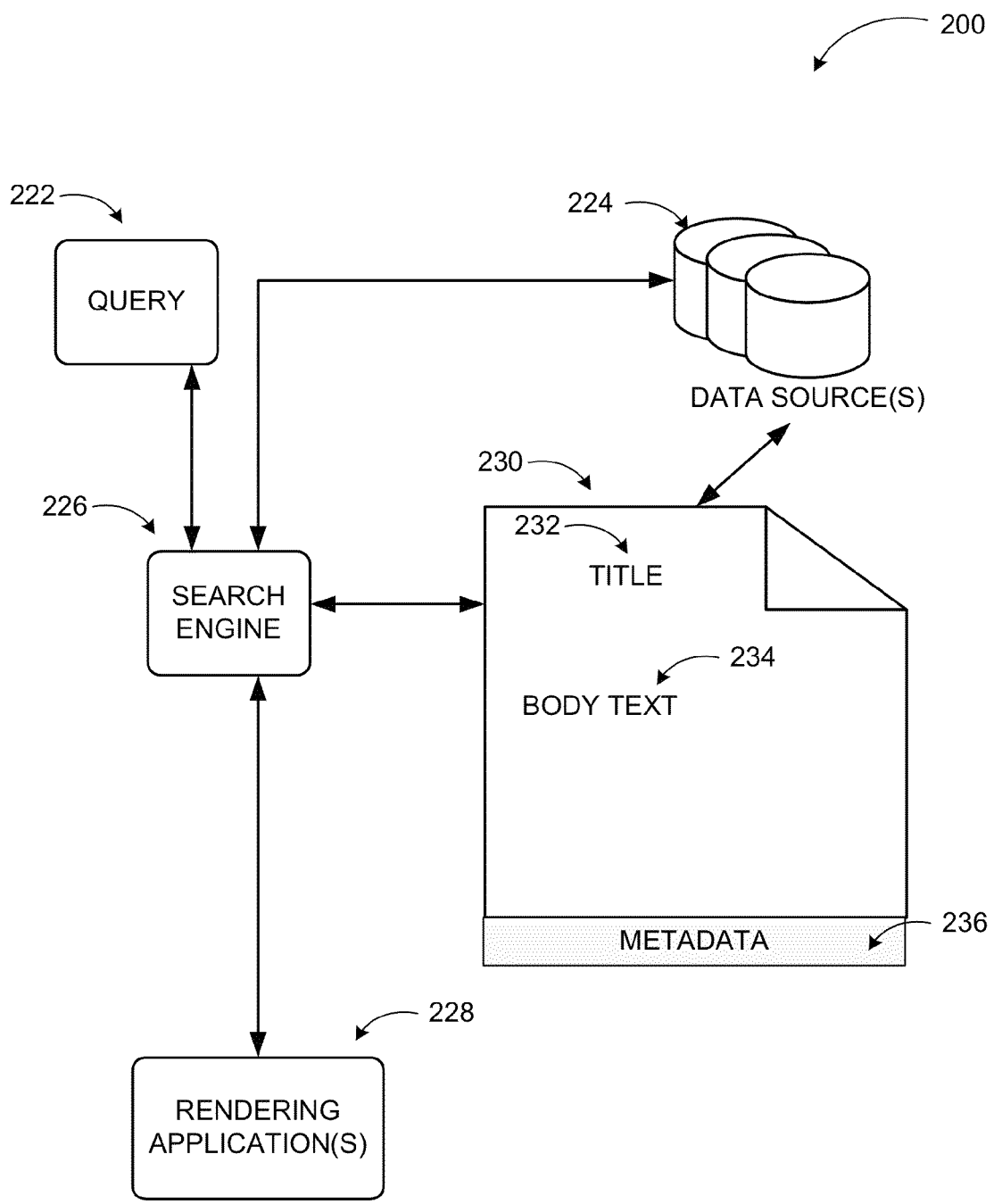
FIG. 2 is a conceptual diagram illustrating a flow of search operations involving documents.

FIG. 2 is a conceptual diagram illustrating a flow of search operations involving documents. Discounted cumulative gain (DCG) is a measure of effectiveness of a search engine algorithm or related applications, often used in information retrieval (IR). Using a graded relevance scale of documents in a search engine result set, DCG measures the usefulness, or gain, of a document based on its position in the result list. The gain is accumulated cumulatively from the top of the result list to the bottom with the gain of each result discounted at lower ranks DCG penalizes highly relevant documents appearing lower in a search result list by reducing graded relevance value logarithmically proportional to the position of the result. The DCG accumulated at a particular rank position p ($DCG_p$) may be expressed as:

$$DCG_p = rel_1 + \sum_{i=2}^{p} \frac{rel_i}{\log_2 i}. \quad [1]$$

Search result lists tend to vary in length depending on the query. Comparing a search engine's performance from one query to the next query may not be consistently achieved using DCG alone. Thus, the cumulative gain at each position for a chosen value of p may be normalized across queries. This may be accomplished by sorting documents of a result list by relevance, producing an ideal DCG at position p. For a query, the normalized discounted cumulative gain (NDCG) may be computed as:

$$NDCG_p = \frac{DCG_p}{IDCG_p}, \quad [2]$$

where $IDCG_p$ is the ideal $DCG_p$ at position p.

NDCG may also be expressed incorporating a cutoff such that only top L returned documents are considered (a more realistic situation):

$$NDCG@L = \frac{1}{Z} \sum_{i=1}^{L} \frac{2^{v_i} - 1}{\log_2(1+i)}, \quad [3]$$

where v is a vector of the relevance labels corresponding to the returned documents and Z is a normalization factor equal to the ideal NDCG at cutoff L, INDCG@L.

The NDCG values for all queries may be averaged to obtain a measure of the average performance of a search engine's ranking algorithm. In a perfect ranking algorithm, the DCGp may be the same as the IDCGp producing an NDCG of 1.0. NDCG calculations are then relative values between 0.0 to 1.0 and are, thereby, cross-query comparable.

A search engine according to embodiments provides optimized NDCG by training a dependency parser in a supervised manner from relevance judgments. A number of dependency parser models may be employed to process long queries. While conventional search algorithms focus on training parsers in an unsupervised manner or using the traditional syntactic trees, embodiments are directed to a supervised technique that uses relevance judgments to train a dependency parser such that it approximately optimizes NDCG. According to some embodiments, tree comparison features may be added to a standard ranking function. For example, a weighted tree edit distance between the parse tree for a query and the parse tree for a document title may be added to the ranking function, where the edit distance weights are parameters from the parser.

Training data includes queries and documents matching them together with relevance degree of each match. The training data and relevance may be prepared manually by human assessors, who check results for some queries and determine relevance of each result. Training data is then used by a learning algorithm to produce a ranking model, which computes the relevance of documents for actual queries. The ranking model may approximate the solution using a classification problem, for example, training a binary classifier which can tell which document is better in a given pair of documents. Some embodiments may implement RankNet® by Microsoft Corp. of Redmond, Wash. as the objective function of the ranking model. To optimize the parser's parameters for NDCG, normalization and positivity constraints may be added to a RankNet cross-entropy based objective function to ensure that the parser parameters normalize to 1 appropriately and stay non-negative.

A more complex structure exists in many long queries for search operations compared to short queries. Embodiments approach the search operations from an optimization perspective that focuses on learning tree structures for queries (and document content). Searchable document contents may include, but are not limited to, titles, body text, and metadata. Receiving a query (long query) 222 and document 230 for the training phase, search engine 226 may train its parser using the tree edit distances and NDCG constraints. Title 232, body text 234, and/or metadata 236 may be used as search elements. Document 230 may be retrieved from one or more data sources 224 as discussed previously. Once the training is complete and NDCG optimized, the same parser may be employed for performing searches on actual queries and results provided to rendering application(s) 228.

Figure 3:
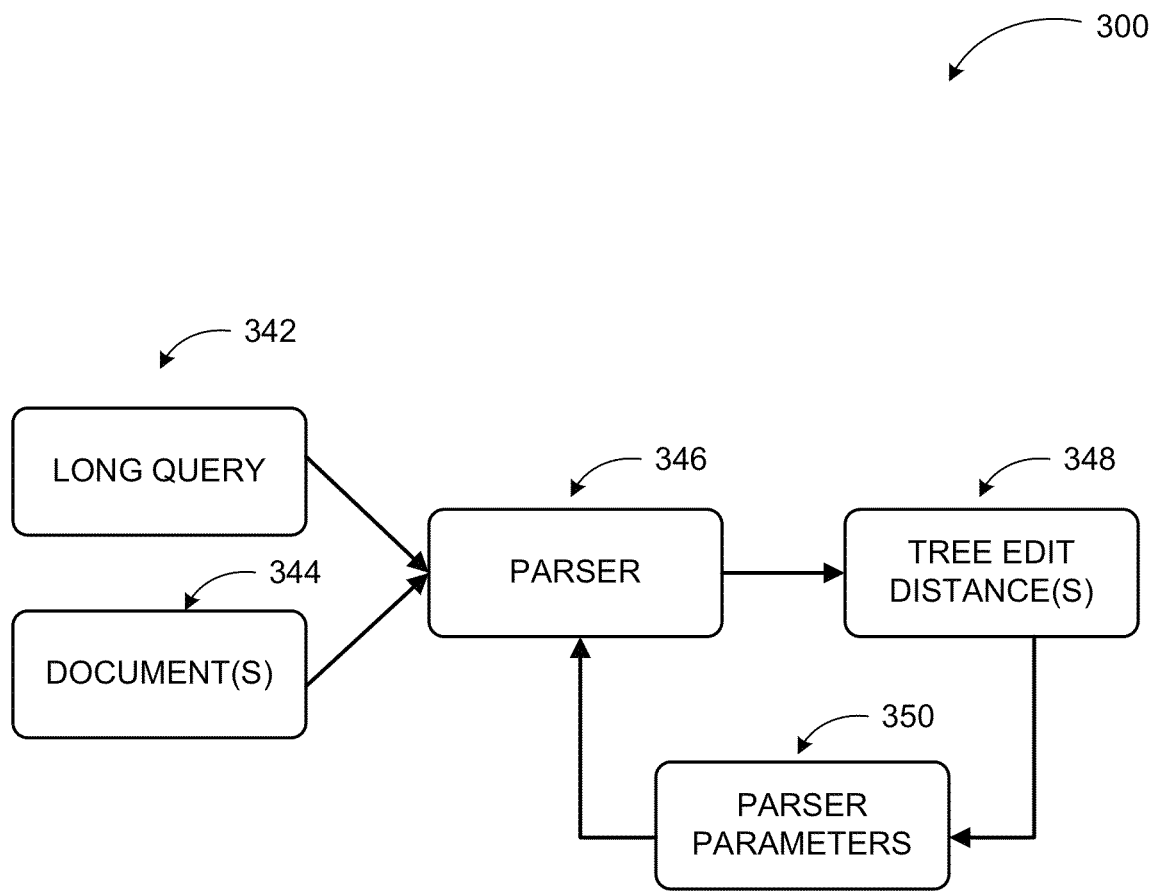
FIG. 3 is a block diagram of major components in a search system according to embodiments.

FIG. 3 includes block diagram 300 of major components in a search system according to embodiments. An optimization according to embodiments starts with a dependency parsing model, initially setting the parser parameters 350 heuristically. Then, a set of training queries 342 and associated document contents 344 are parsed (346) and the tree edit distance 348 between the query-document pairs computed. Training data includes query-document pairs, where the documents are labeled as relevant or irrelevant to their associated queries. The tree edit distance 348 between a given query tree and document title tree is a combination of operations such as node insertion, deletion, and substitution, and the cost associated with each of these operations is a function of the parsing parameters 350 that created the deleted/inserted/substituted nodes. When the components of this tree edit distance are added to the function that is used to rank retrieved documents for a query, a ranking function is obtained that includes many of the parsing parameters 350.

According to some embodiments, the ranking function may be used in a RankNet convex cross-entropy objective function, and its derivatives with respect to the parser parameters used with gradient descent to optimize the parser 346 for the search task. Optionally, the gradient may be scaled by a function of NDCG. The resulting parser may contribute enhanced features to the ranking function, and ultimately improve search results for long queries.

In an example implementation, all parsing model probabilities $\theta_1$ may be set equal initially. Using these probabilities, an appropriate parse tree may be selected for each query Q and each document D, for example, using Viterbi parsing. The Viterbi parse for a segment of length L can be found in time $O(L^3)$. Given these trees, the documents may be ranked for each query according to a tree edit distance score function $f$. Tree edit distance for a tree with m nodes and a tree with n nodes may be computed in time $O(m^2 n \log n)$. At this point, the counts for the parameter update equations may be computed. Thus, after performing a line search to find the appropriate step size, the parameters may be updated. Subsequently, the process may be performed in the iterative manner reparsing Q and D with the new parsing model probabilities, selecting new parse trees, and so on.

According to other embodiments, a dependency model with valence (DMV) may be used as the parsing model. This model corresponds to a generative story, where first the root of the tree is generated and for each of its children a choice is made to continue generating children and then a separate choice made to generate a particular child. Finally, the model makes the choice to stop generating children, after which these children generate their own children in the same manner, and so on.

The DMV is more complex than typical parsing models. Not only are the links in this model directional, but they are also not entirely independent since the stopping probability conditions on whether any children have already been generated in the direction under consideration. The added complexity, however, allows the model to learn more interesting relationships, which may help it to more precisely indicate user needs than standard features such as mutual information for words. Because the aim is to estimate the relevance of a particular document D for a query Q, a number of distance ranking algorithms may be employed by assigning each (Q, D) pair a score based on the edit distance between their parse trees.

According to further embodiments, more complex substitution, insertion, and deletion costs may be defined in distance ranking For example, the costs may be conditioned on the relevance of the words involved, or depend on a node's height in the tree or its number of children. While NDCG is used as evaluation metric in example implementations, embodiments are not limited to NDCG, and other metrics may also be employed. NDCG not only takes into account the degree of relevance of a document, but also expresses the key intuition that the earlier a relevant document appears in a list of search results, the better. Further, NDCG can incorporate a cutoff so that only the top L returned documents are considered, which is realistic in a search situation where a user is likely only to take the time to consider documents at the top of the ranking.

The overall objective in terms of a cost function may include the parsing model parameters (E.g., root, child, stop parameters), a vocabulary of observed words, and the set of documents D(k) retrieved for a query Q(k). The constraint functions in the objective ensure that the parsing model's parameters normalize appropriately and are non-negative.

The examples in FIGS. 1, 2, and 3 have been described with specific document types, data types, algorithms, and interactions. Embodiments are not limited to systems according to these example configurations. Training a parser to optimize NDCG may be implemented in configurations using other types of documents, reports, and data in a similar manner using the principles described herein.

Figure 4:
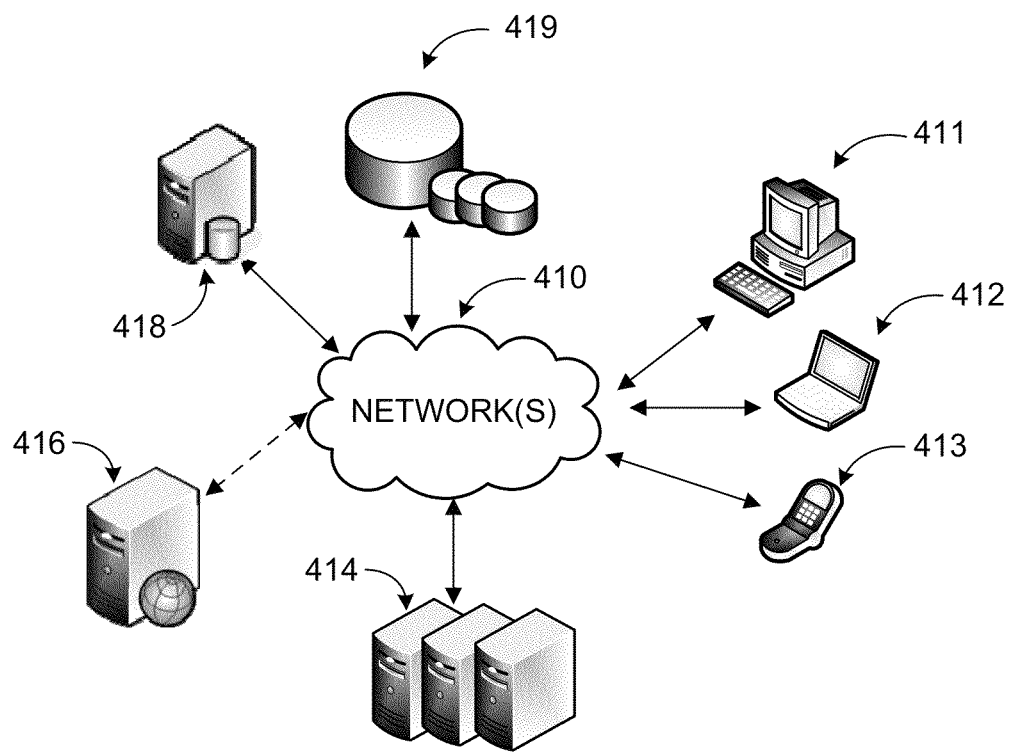
FIG. 4 is a networked environment, where a system according to embodiments may be implemented.

FIG. 4 is an example networked environment, where embodiments may be implemented. A platform providing searches where a parser for the search operations is trained to optimize NDCG may be implemented via software executed over one or more servers 414 such as a hosted service. The platform may communicate with client applications on individual computing devices such as a smart phone 413, a laptop computer 412, or desktop computer 411 ('client devices') through network(s) 410.

Client applications executed on any of the client devices 411-413 may submit a search request to a search engine on the client devices 411-413, on the servers 414, or on individual server 416. The search engine may crawl documents compute weighted tree edit distances between a query and a document, compute a ranking function, and optimize the NDCG by adjusting parser parameters from the ranking function using constraints in an iterative algorithm as discussed previously. The service may retrieve relevant data from data store(s) 419 directly or through database server 418, and provide the ranked search results to the user(s) through client devices 411-413.

Network(s) 410 may comprise any topology of servers, clients, Internet service providers, and communication media. A system according to embodiments may have a static or dynamic topology. Network(s) 410 may include secure networks such as an enterprise network, an unsecure network such as a wireless open network, or the Internet. Network(s) 410 may also coordinate communication over other networks such as Public Switched Telephone Network (PSTN) or cellular networks. Furthermore, network(s) 410 may include short range wireless networks such as Bluetooth or similar ones. Network(s) 410 provide communication between the nodes described herein. By way of example, and not limitation, network(s) 410 may include wireless media such as acoustic, RF, infrared and other wireless media.

Many other configurations of computing devices, applications, data sources, and data distribution systems may be employed to implement a framework for parsing and indexing dynamic reports. Furthermore, the networked environments discussed in FIG. 4 are for illustration purposes only. Embodiments are not limited to the example applications, modules, or processes.

Figure 5:
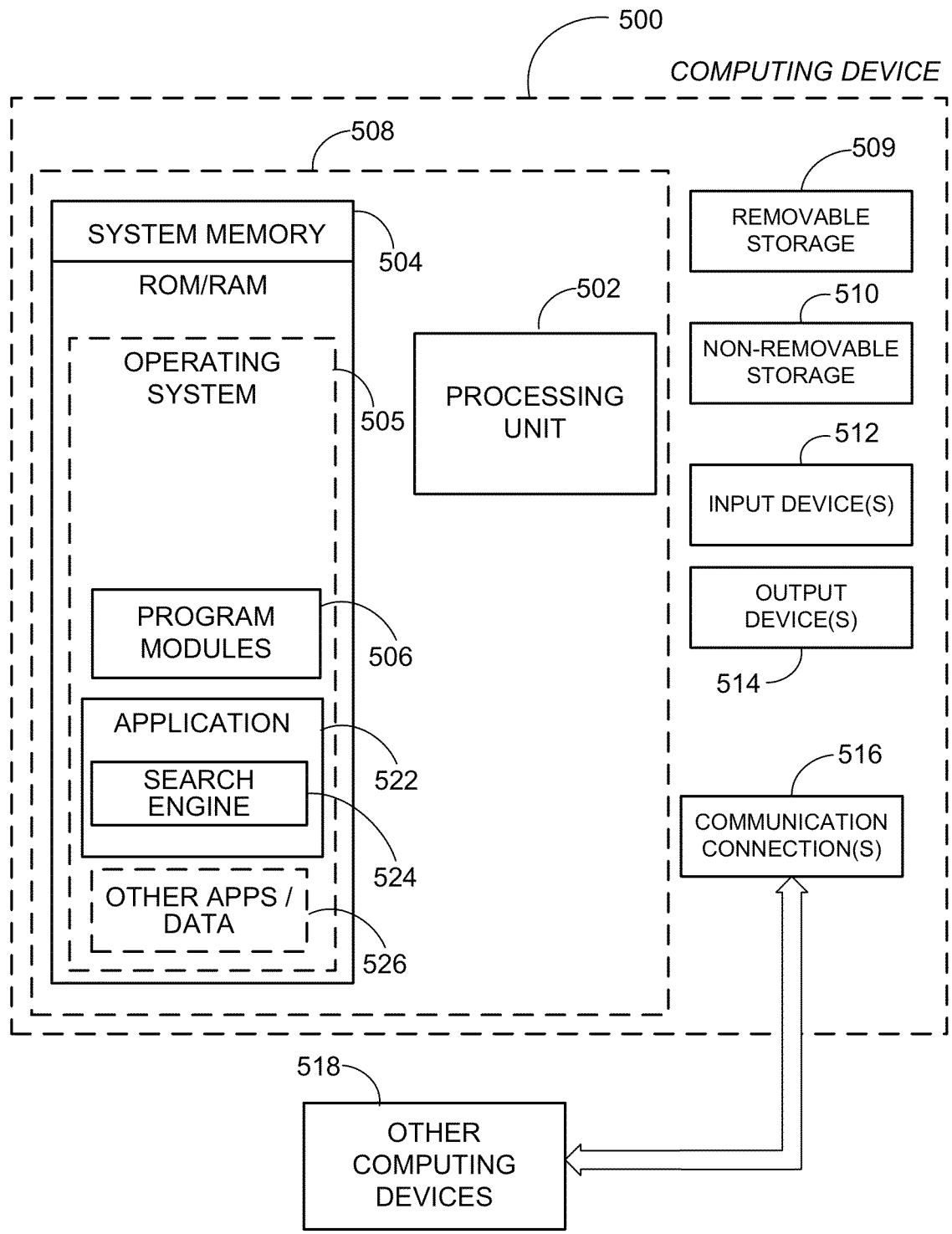
FIG. 5 is a block diagram of an example computing operating environment, where embodiments may be implemented.

FIG. 5 and the associated discussion are intended to provide a brief, general description of a suitable computing environment in which embodiments may be implemented. With reference to FIG. 5, a block diagram of an example computing operating environment for an application according to embodiments is illustrated, such as computing device 500. In a basic configuration, computing device 500 may be a client device executing a client application capable of performing searches or a server executing a service capable of performing searches according to embodiments and include at least one processing unit 502 and system memory 504. Computing device 500 may also include a plurality of processing units that cooperate in executing programs. Depending on the exact configuration and type of computing device, the system memory 504 may be volatile (such as RAM), non-volatile (such as ROM, flash memory, etc.) or some combination of the two. System memory 504 typically includes an operating system 505 suitable for controlling the operation of the platform, such as the WINDOWS® operating systems from MICROSOFT CORPORATION of Redmond, Wash. The system memory 504 may also include one or more software applications such as program modules 506, search capable application 522, search engine 524, and optionally other applications/data 526.

Application 522 may be any application that is capable of performing search through search engine 524 on other applications/data 526 in computing device 500 and/or on various kinds of data available in an enterprise-based or cloud-based networked environment. Search engine 524 may crawl, index, perform searches, and rank results training a parser to approximately optimize NDCG as discussed previously. Application 522 and search engine 524 may be separate applications or an integral component of a hosted service. This basic configuration is illustrated in FIG. 5 by those components within dashed line 508.

Computing device 500 may have additional features or functionality. For example, the computing device 500 may also include additional data storage devices (removable and/or non-removable) such as, for example, magnetic disks, optical disks, or tape. Such additional storage is illustrated in FIG. 5 by removable storage 509 and non-removable storage 510. Computer readable storage media may include volatile and nonvolatile, removable and non-removable media implemented in any method or technology for storage of information, such as computer readable instructions, data structures, program modules, or other data. System memory 504, removable storage 509 and non-removable storage 510 are all examples of computer readable storage media. Computer readable storage media includes, but is not limited to, RAM, ROM, EEPROM, flash memory or other memory technology, CD-ROM, digital versatile disks (DVD) or other optical storage, magnetic tape, magnetic disk storage or other magnetic storage devices, or any other medium which can be used to store the desired information and which can be accessed by computing device 500. Any such computer readable storage media may be part of computing device 500. Computing device 500 may also have input device(s) 512 such as keyboard, mouse, pen, voice input device, touch input device, and comparable input devices. Output device(s) 514 such as a display, speakers, printer, and other types of output devices may also be included. These devices are well known in the art and need not be discussed at length here.

Computing device 500 may also contain communication connections 516 that allow the device to communicate with other devices 518, such as over a wired or wireless network in a distributed computing environment, a satellite link, a cellular link, a short range network, and comparable mechanisms. Other devices 518 may include computer device(s) that execute communication applications, other web servers, and comparable devices. Communication connection(s) 516 is one example of communication media. Communication media can include therein computer readable instructions, data structures, program modules, or other data. By way of example, and not limitation, communication media includes wired media such as a wired network or direct-wired connection, and wireless media such as acoustic, RF, infrared and other wireless media.

Example embodiments also include methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be collocated with each other, but each can be only with a machine that performs a portion of the program.

Figure 6:
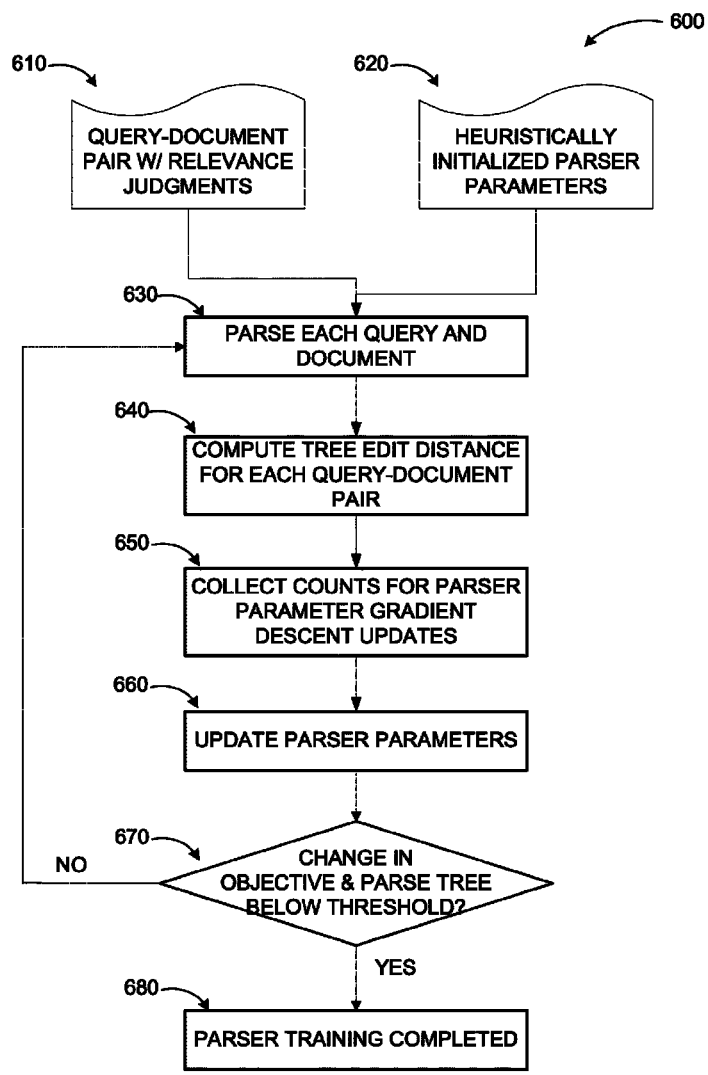
FIG. 6 illustrates a logic flow diagram for a process of training a parser to optimize NDCG according to embodiments.

FIG. 6 illustrates a logic flow diagram for process 600 of training a parser to optimize NDCG according to embodiments. Process 600 may be implemented as part of an application executed on a server or client device.

Process 600 begins with inputs 610 and 620, which, respectively, provide query-document pairs with relevance judgments and heuristically initialized parser parameters. At operation 630, each query and document may be parsed, for example, using an algorithm that chooses a parent for each child based on a maximum posterior probability of all possible parents for that child (e.g., Viterbi parsing algorithm). The parse trees for each query-document pair may be used in computing tree edit distance for each pair at operation 640 such that the documents can be ranked for each query according to a tree edit distance score function $f$.

The counts for the parameter update equations may be computed at operation 650 and parser parameters updated for the gradient descent based on the counts at subsequent operation 660. The iterative optimization may be driven by decision operation 670, which determines whether a change in the objective and parse tree is below a predefined threshold (e.g., negligible). If the threshold is reached, the training of the parser is completed at operation 680. If the threshold has not been reached yet, the process may return to operation 630 continuing to perform reparsing Q and D with the new parsing model probabilities, selecting new parse trees, and so on. An example algorithm may look like:

```
Initialize θ
while cross-entropy gradient is non-zero do
    foreach x ∈ Q U D do
        Parse x O(L³)
    end
    foreach q ∈ Q do
        foreach d ∈ Dq do
            Tree edit distance O(|Tq|²|Td|)
        end
    end
    Collect counts for θ updates
    Update θ
end
```

The operations included in process 600 are for illustration purposes. Training parsers to optimize NDCG may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method to be executed at least in part in a computing device for training a parser to optimize search operations, the method comprising:
   receiving a query and a plurality of returned documents with relevance judgments;
   parsing the query and the documents to obtain parse trees;
   computing tree edit distances for each query-document pair based on the parse trees;
   incorporating the tree edit distances to a ranking function employed for ranking the documents for the received query;
   determining updated parser parameters from the ranking function; and
   updating the parser with the updated parser parameters in an iterative manner until a predefined threshold is reached.

2. The method of claim 1, further comprising:
   initializing the parser parameters heuristically prior to a first parsing operation.

3. The method of claim 1, further comprising:
   collecting counts for the parser parameter gradient descent for determining the updated parser parameters.

4. The method of claim 1, wherein the parser parameters are updated to optimize a Normalized Discount Cumulative Gain (NDCG) of an information retrieval engine.

5. The method of claim 1, wherein a tree edit distance between a query tree and a corresponding document tree is a combination of at least one from a set of: node insertion, deletion, and substitution operations.

6. The method of claim 5, wherein a cost associated with each of the operations is a function of the parsing parameters that created respective nodes associated with the node insertion, deletion, and substitution operations.

7. The method of claim 1, wherein the ranking function includes a RankNet convex cross-entropy objective function and at least one of its derivatives.

8. The method of claim 1, wherein the parsing is performed employing an algorithm that chooses a parent for each child based on a maximum posterior probability of all possible parents for that child.

9. The method of claim 1, wherein the parser parameters include at least one from a set of: root, child, and stop parameters.

10. The method of claim 1, wherein the query is a long query.

11. A computing device for training a parser to optimize search operations, the computing device comprising:
    a memory storing instructions;
    a processor coupled to the memory, the processor executing a search engine in conjunction with the instructions stored in the memory, wherein the search engine is configured to:
       receive a query and a plurality of returned documents with relevance judgments;
       initialize parser parameters of the parser heuristically;
       parse the query and the documents to obtain parse trees;
       compute tree edit distances for each query-document pair based on the parse trees;
       incorporate the tree edit distances to a ranking function employed for ranking the documents for the received query;
       collect counts for a parser parameter gradient descent to determine updated parser parameters for optimizing a Normalized Discount Cumulative Gain (NDCG) of the search engine; and
       update the parser with the updated parser parameters in an iterative manner until a predefined threshold is reached.

12. The computing device of claim 11, wherein the search engine is further configured to scale the gradient by a selected function of the NDCG.

13. The computing device of claim 11, wherein the search engine employs a dependency model with valence (DMV) for the parser.

14. The computing device of claim 11, wherein the search engine is further configured to:
    employ at least one from a set of: node insertion, deletion, and substitution operation costs in tree edit distance based ranking of the returned documents.

15. The computing device of claim 14, wherein the search engine is further configured to:
    employ a cost function conditioned on at least one from a set of: a relevance of words in a returned document, a node's height in a parse tree, and a number of children of a node in a parse tree.

16. The computing device of claim 11, wherein the NDCG for top L returned documents is defined as:

$$NDCG@L = \frac{1}{Z}\sum_{i=1}^{L} \frac{2^{v_i} - 1}{\log_2(1 + i)},$$

where v is a vector of relevance labels corresponding to the returned documents, Z is a normalization factor substantially equal to an ideal NDCG at cutoff L "INDCG@L".

17. The computing device of claim 11, wherein the parser examines at least one from a set of: a title, a body text, and a metadata of each returned document.

18. A computer-readable storage medium with instructions stored thereon for supervised training of a dependency parser to optimize search operations, the instructions comprising:
receiving a query and a plurality of returned documents with relevance judgments;
initializing parser parameters of the parser heuristically;
parsing the query and the documents to obtain parse trees;
computing tree edit distances for each query-document pair based on the parse trees, wherein each tree edit distance between a query tree and a corresponding document tree is a combination of at least one from a set of: node insertion, deletion, and substitution operations;
incorporating the tree edit distances to a ranking function employed for ranking the documents for the received query;
collecting counts for a parser parameter gradient descent to determine updated parser parameters for optimizing a Normalized Discount Cumulative Gain (NDCG) of the search engine; and
updating the parser with the updated parser parameters in an iterative manner until a predefined threshold for NDCG optimization is reached.

19. The computer-readable medium of claim 18, wherein the instructions further comprise:
adding at least one of a normalization constraint and a positivity constraint to a cross-entropy based convex objective function to ensure that the parser parameters normalize to approximately 1 and stay non-negative.

20. The computer-readable medium of claim 19, wherein the objective function includes at least one from a set of: a root parsing model parameter, a child parsing model parameter, a stop parsing model parameter, a vocabulary of observed words in the returned documents, and a set of the returned documents for the query.

* * * * *